Feb. 11, 1941.   I. M. LADDON ET AL   2,231,630
FUEL DUMP VALVE
Filed Jan. 18, 1939
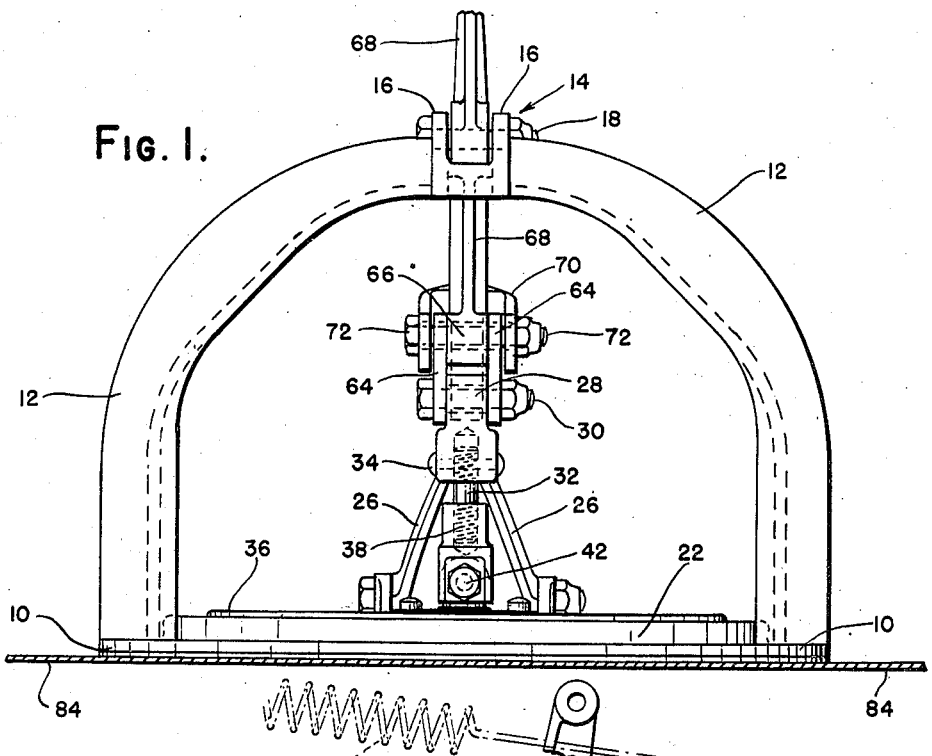
Fig. 1.
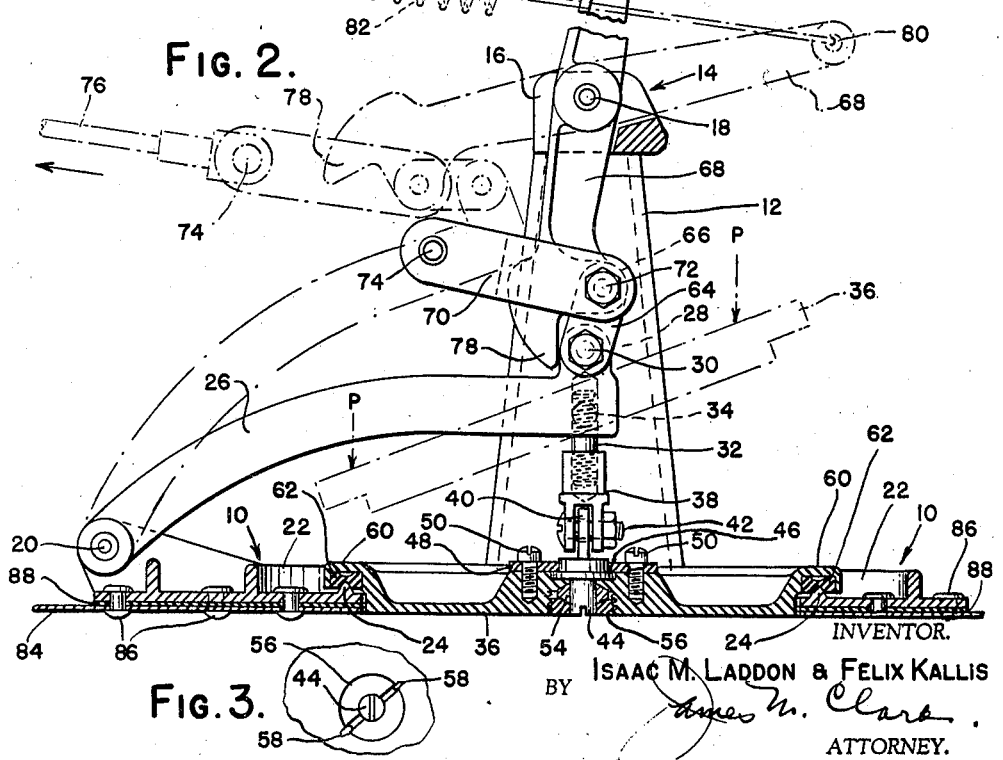
Fig. 2.
Fig. 3.
INVENTOR.
ISAAC M. LADDON & FELIX KALLIS
BY
ATTORNEY.

Patented Feb. 11, 1941

2,231,630

UNITED STATES PATENT OFFICE 2,231,630

FUEL DUMP VALVE

Isaac M. Laddon and Felix Kallis, San Diego, Calif., assignors to Consolidated Aircraft Corporation, a corporation of Delaware Application January 18, 1939, Serial No. 251,492

10 Claims. (Cl. 137—21)

This invention relates to automatically closable emergency release or dump valves for fluid containers, and more particularly for aircraft fuel tanks.

The present invention represents an improvement over existing types of valves designed to provide for the quick release or dumping of the contents of a tank. Valves of this general type have been used extensively in aircraft fuel tanks such that in an emergency, necessitating a forced landing, the inflammable load of gasoline could be quickly disposed of and thus the danger of explosion following the landing would be minimized. Previously such valves had certain mechanical faults which rendered them far from satisfactory in use. For instance, the earliest valves were of the non-reclosable type. Thus, when the valve had once been tripped it was impossible to again close it until after the aircraft had been brought to earth. Under these circumstances, it was never possible for the pilot to save some of his fuel if the emergency was subsequently averted or if it was deemed necessary only to lighten the ship rather than to dispose of its entire load of fuel. Other disadvantages possessed by these valves were due to their mechanical unreliability. Later valves, of the same general type, were adapted to be reclosed while in flight but the closing operation had to be definitely performed by the pilot or other operator. The closing was made difficult because, as these valves were usually constructed, the closure member had to be forced into place against the issuing stream of the fluid. Also, these valves were subject to leakage through wear of the parts and due to the pressure action of the inclosed fluid tending to force the valve open. Any or all of these faults in a valve serve to render them unsatisfactory for use in aircraft, but up to the present time no satisfactory solution of these various difficulties has been presented.

It is thus an object of our invention to provide a reclosable dump valve which will be free of the limitations outlined above. An emergency dump valve thus characterized will be reclosable at the will of the operator and such closing will occur automatically without human attention. Such a valve will dump all or part of the fuel as quickly as possible and will be positive in its closing action so that the flow of fluid will be cut off immediately. It will be leak-proof; utilizing the pressure of the entrapped fluid to assist in sealing the valve joint and it will be of simple, sturdy construction so that there will be little danger of breakage of the parts or of failure in operation.

Other objects and advantages will be hereinafter set forth in the following description and in the accompanying drawing, in which like numerals indicate like parts and in which, Fig. 1 is a front elevation of the novel valve assembly;

Fig. 2 is a side view of the valve assembly with the valve closure and the associated valve seat shown in section; and Fig. 3 is a bottom view of the center portion of the valve closure showing the adjusting screw.

With reference to Figs. 1 and 2 of the drawing, the preferred embodiment of our invention is shown to include an annular base or frame 10 provided with an inverted, U-shaped support member 12. This member 12 can be cast integrally with the frame 10 or formed separately and be affixed thereto by any suitable means. In any event the U-shaped member 12 serves to partially support the operating mechanism of the valve and to that end is fashioned with a fitting 14 at the midpoint of its curve. This fitting includes two upstanding, spatially separated lugs 16 and each of these is pierced with a bore in line with that of the other so as to be able to receive a pivot bolt 18.

The annular frame 10 of the valve not only sustains the pivot bolt, or point 18, but also a second pivot point 20 disposed so that its axis is parallel to the axis 18. Between and upon these two pivot points all of the valve operating mechanism is hung as will be explained in greater detail hereinafter. The frame also provides a seat for the valve closure element which is surrounded by a short cylindrical wall 22. The valve seat itself is formed as shown at 24 with a triangular ridge running concentrically around the otherwise flat surface of the seat.

Connected to pivot about the point 20, is a yoke 26 which curves upwardly and inwardly to terminate over the center of the frame 10. At its free end there is formed an upstanding knob 28 apertured to receive a pivot bolt 30 transversely therethrough, from the underside extending upwardly, a hole threaded to receive a short length of stud 32, threaded and locked therein by a transverse pin 34 and serving to sustain the valve closure element 36, which is pivotally hung thereon. This pivot connection provides for proper seating of the valve since it allows uniform distribution of the closing pressure on the valve seat or packing. In detail the connection comprises a forked fitting 38 screwed on the lower end of the stud 32 and this fitting is formed with two spaced, apertured ears into which is fitted an apertured blade 40. Extending through the apertures of both the ears and the blade 40 is a bolt 42 which serves pivotally to join the two together. The blade portion 40 is a flattened extension of the adjusting pin 44 which serves principally to sustain the valve closure element 36. The pin 44 has four component parts, namely the blade portion 40, an adjacent cylindrical portion, a flanged portion 46 of relatively large diameter, and the stem which extends through a central aperture in the valve closure 36. This central aperture is bored through the thickened middle part of the closure 36 and is recessed on top to wholely receive the flange 46. An apertured plate 48 overlies the flange 46 and is secured to the element 36 by bolts 50 so that the pin 44 and closure 36 are fixed together in a manner permitting relative rotation therebetween.

The adjustable pin assembly 44 is rendered fluidproof by surrounding it with a packing 54 held in place by an annular nut 56 slotted for turning which after final tightening may be fixed in adjustment by the use of prick punching as shown at 58 in Fig. 3.

The valve closure element 36 is formed around its periphery with an overturned rim 60. The rim is so constructed that a channel-shaped groove is left in its underside and into this is fitted a resilient ring member adapted to engage the valve seat ridge 24 and form therewith a water-tight seal of the valve opening.

Returning to the yoke 26 of the valve operating mechanism, the pivot bolt 30 serves to attach a pair of identical links 64 to each side of the knob 28. These links 64 also attach to either side of an apertured projection 66 which is integrally a part of a pivoted locking lever 68 and partially surrounding the projection 66 and link 64 is a U-shaped strap 70 which is pivotally joined thereto by a bolt and nut combination 72. At the midpoint of its length the member 70 has an apertured tab 74 to which an operating cable 76 can be pivotally attached.

The locking lever 68 is formed with a nose piece 78 which in the closed position of the valve engages the knob 28 to function as a stop. At about the midpoint of the length of lever 68 is formed a boss which is apertured to pass the previously mentioned bolt 18 and this effectively forms the pivotal mounting for the lever. At its other end the lever 68 has an aperture or other suitable means of attaching a coil spring 82 which is anchored to a fixed part of the associated tank structure and which tends to restore the lever 68 to its vertical position whenever it is moved away therefrom.

The installation of the dump valve is made upon the bottom skin 84 of the fuel tank so as to be positioned internally thereof. The valve frame 10 is permanently fastened to the skin by rivets 86 and the resulting joint is made water-tight through the use of an interposed gasket 88. With this construction all of the valve structure lies completely within the tank outline.

The operation of the valve is as follows: To cause opening from the closed position, a pull is made upon the cable 76, in the direction of the arrow, which acts directly upon the pivot bolt 72 and thereby causes a concurrent swinging of the yoke 26 counterclockwise about its pivot 20 and of the locking lever 68 about its pivot 18. These two parts move in unison because they are connected through the pivotal links 64. This movement causes the lifting of the valve closure 36 from its seat 24 in the first case and in the second, a stretching of the spring 82. When the valve is fully open the parts assume the dotted line position of Fig. 2. Release of the cable, on the other hand, allows the spring 82 to act on the lever 68 and pull it into its former full line position where the nose 78 hits the knob 68 thus acting as a stop. When the valve element 36 is seated the distance between the points 18 and 30 is less than the combined distance 18—72 and 72—30 thus making the combination of lever 68 and links 64 into a toggle joint which assures definite seating of the valve and prevents it from opening accidentally. In opening, when the pivot 72 moves to the left and passes through the straight line between the points 18 and 30, the valve moves down and compresses the ring seal 62 until such time as point 72 starts to move up, which subsequently occurs because it travels on an arc with its center at 18.

The square lower end of the fitting 38 restrains the valve element 36 from swinging too freely upon bolt 42 with the purpose of preventing the edge of the closure from catching on the edge of the valve seat which happening might prevent it from closing properly. A feature of this construction which assists in the closing of the valve is the location of the valve closure 36 on the pressure side of the valve seat to the end that the internal pressure of the fluid is exerted, as shown by the arrows P in Fig. 2, so as to aid in the positioning and seating thereof. Another feature is that the dump valve can be adjusted for fluid tightness at its seat by turning the adjusting pin 44 which will cause the fitting 38 to be screwed on to more or less of the length of the stud 32. It should be noted that the pin 44 is accessible from the exterior of the tank and that therefore such adjustments are easily made.

Although the valve according to our invention has been described as principally of use in aircraft fuel tanks, nevertheless, it is not adapted solely to such use but may be employed in any sort of a container where its particular characteristics would operate to advantage. We do not intend that its use be limited to any particular type of installation nor that it be limited to the particular showing or arrangement of parts herein set forth.

We aim in the appended claims to cover all modifications and changes that may fall within the spirit of the invention and what we claim is:

1. In an aircraft tank, an internally mounted dump valve comprising a toggle-actuated pivoted arm, a closure member adjustably articulated to said arm and rotatable means journalled in fluid-tight relationship with said closure member for the adjustment of said articulated connection.

2. In valve construction, a tank wall provided with a valved opening, a valve assembly mounted internally of said tank comprising a closure for said opening, an arm pivotally supported upon said tank wall, universal joint means adapted to adjustably attach said closure to said arm and means journalled within said closure and accessible from the exterior of said tank for adjusting said universal joint means.

3. In aircraft, a tank having an opening in an exterior wall thereof, closure means adapted to engage said opening, toggle means for seating said closure within said opening, spring means urging said toggle into its closure seating position, each said means being disposed entirely within said tank, operating means associated with said toggle to release the same for unseating said closure and means rotatably journalled within and flush with the exterior of said closure adapted for the adjustment of its seating pressure.

4. Mechanism for operating a dump valve for fluid containers including a pivotally mounted yoke serving as the suspension of the valve closure, a pivoted link joining one end of said yoke to an end of a pivotally mounted toggle lever, tension means connected adjacent the other end of said toggle lever adapted to urge said valve into its closed position, and actuating means connected to the junction of said link and lever adapted to rotate said toggle lever in opposition to said tension means for opening said valve.

5. In a fluid tank, an exterior wall having an opening therein, a valve for said opening comprising a closure member, a closure-supporting arm pivotally mounted upon said wall and extending adjacent said opening, the said closure being pivotally supported from said arm, a rigid frame extending into said tank, a bell-crank lever pivotally mounted upon said frame having a portion extending toward said arm, and a toggle link pivotally connecting said arm and lever portion adapted to lock said closure in its closed position.

6. In an internally mounted dump valve for an aircraft fluid container, a valve assembly including a closure element having an opening in an exterior wall of said container, means within the container for the operation of said closure, an externally accessible adjusting means comprising a leakproof element rotatably mounted in said closure, a pin connection between said leakproof element and said means of operation, whereby rotation of said leakproof element adjusts the length of the connection between said closure element and its operating mechanism, the said wall closure and adjusting means presenting a flush and continuous exterior surface.

7. In a fluid tank, an exterior wall having an opening therein, a valve for said opening comprising a closure member, a closure-supporting arm pivotally mounted upon said wall and extending partly across said opening, the said closure being pivotally and adjustably supported from said arm, a rigid frame extending into said tank, a bell-crank lever pivotally mounted upon said frame having a portion extending toward said arm, and a toggle link pivotally connecting said arm and lever portion adapted to lock said closure in its closed position in which the exterior surfaces of said wall, closure and closure-support adjusting means present a flush and continuous surface.

8. In a fluid tank, an exterior wall having an opening therein, a valve in said opening comprising a closure member, a closure-supporting arm pivotally mounted upon said wall and extending inwardly of said opening, the said closure being pivotally supported from said arm, a rigid frame extending into said tank, a bell-crank lever pivotally mounted upon said frame having a portion extending toward said arm, a toggle link pivotally connecting said arm and lever portion adapted to lock said closure in its closed position and actuating means applied to the pivotal connection between said toggle link and lever portion adapted to release said toggle lock and swing said closure into its open position.

9. In a fluid tank, an exterior wall having an opening therein, a valve for said opening comprising a closure member, a closure-supporting arm pivotally mounted upon said wall and extending partly across said opening, the said closure being pivotally supported from said arm, a rigid frame extending into said tank, a bell-crank lever pivotally mounted upon said frame having a portion extending toward said arm, a toggle link pivotally connecting said arm and a lever portion adapted to lock said closure in its closed position, tension means applied to an opposed lever portion of said bell-crank urging said closure into said closed position and actuating means applied to the pivotal connection between said toggle link and lever adapted to release said toggle lock and swing said closure into its open position.

10. In aircraft construction, a tank wall forming an exterior surface of the aircraft provided with an opening therein, a frame element attached to the inner side of said wall and having an inwardly extending seat portion, a valve closure having an offset portion engageable with said seat adapted in its closed position to occupy said opening, whereby the exterior surfaces of said wall and closure present a flush and continuous surface to the airstream, toggle actuating means disposed entirely within said tank for the operation of said valve closure and toggle adjusting means carried by said closure having its operating portion accessible from and flush with the exterior surfaces in said closed position.

ISAAC M. LADDON.
FELIX KALLIS.